(12) United States Patent  (10) Patent No.: US 7,895,912 B2
Arai  (45) Date of Patent: Mar. 1, 2011

(54) POWER TRANSMISSION CONTROLLING APPARATUS

(75) Inventor: Masayuki Arai, Toyota (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 313 days.

(21) Appl. No.: 12/178,046

(22) Filed: Jul. 23, 2008

(65) Prior Publication Data

US 2009/0042693 A1  Feb. 12, 2009

(30) Foreign Application Priority Data

Aug. 8, 2007  (JP) ............................. 2007-206303

(51) Int. Cl.
*F16H 59/00* (2006.01)
(52) U.S. Cl. ......................................................... 74/335
(58) Field of Classification Search .................. 74/335; 180/249; 701/62
See application file for complete search history.

(56) References Cited

U.S. PATENT DOCUMENTS

| | | | | |
|---|---|---|---|---|
| 5,016,724 | A | * | 5/1991 | Steinhagen et al. ......... 180/197 |
| 5,444,623 | A | * | 8/1995 | Genise ......................... 701/52 |
| 5,650,932 | A | * | 7/1997 | Chan et al. .................... 701/62 |
| 6,202,016 | B1 | * | 3/2001 | Stephenson et al. ........... 701/51 |
| 6,278,927 | B1 | * | 8/2001 | Fox et al. ....................... 701/62 |
| 2002/0115528 | A1 | | 8/2002 | Kigoshi |
| 2004/0116252 | A1 | | 6/2004 | Iwamoto et al. |
| 2005/0126321 | A1 | | 6/2005 | Ochi et al. |

FOREIGN PATENT DOCUMENTS

| | | |
|---|---|---|
| JP | 6-323424 A | 11/1994 |
| JP | 10-181373 A | 7/1998 |
| JP | 2001-287557 A | 10/2001 |
| JP | 2002-250433 A | 9/2002 |
| JP | 2004-144293 A | 5/2004 |
| JP | 2005-172148 A | 6/2005 |

\* cited by examiner

*Primary Examiner*—Dirk Wright
(74) *Attorney, Agent, or Firm*—Sughrue Mion, PLLC

(57) ABSTRACT

A power transmission controlling apparatus for controlling a power transmission mechanism provided with a main transmission 2 and an auxiliary transmission 2 to be operated in any one of the changeable high and low speed output states. The auxiliary transmission 20 is operative to perform a changing operation to change one of the high and low speed output states into the other thereof when outputting a drive power and constructed to return its starting position when the changing operation is brought out of an allowable condition preliminarily set based on the operation states of the main transmission 20 in the time period from the time the changing operation starts to the time the changing operation is finished so that the changing operation can be smoothly and stably performed with no unpleasant gear noises.

14 Claims, 5 Drawing Sheets

POWER TRANSMISSION CONTROLLING APPARATUS

BACKGROUND OF THE INVENTION

1. Field of the Invention

The present invention relates to a power transmission controlling apparatus and more particularly to a power transmission controlling apparatus for use in automotive vehicles and suitable for controlling a power transmission mechanism provided with a main transmission and an auxiliary transmission positioned at the rear stage of the main transmission.

2. Description of the Background Art

The power transmission mechanism of this type is usually provided with a main transmission operable in a plurality of predetermined operation stages, and an auxiliary transmission operable together with the main transmission and changeable in two different stages including high and low speed stages and simple in construction to realize a high peed change ratio.

In the power transmission mechanism thus constructed, the auxiliary transmission is provided in a transfer to be controlled independently from the main transmission and operative in a low speed stage (hereinafter simply referred to as "Low mode") or a high speed stage (hereinafter simply referred to as "High mode"). When an automotive vehicle such as for example a four-wheel drive vehicle is cruising on bad roads, rocky roads and the like, the auxiliary transmission is operated in the Low mode changed from the High mode to ensure a four-wheel drive operation with a necessary drive power under a high reduction ratio as compared with that of its usual drive operation.

On the other hand, the changing operation between the High and Low modes requires the main transmission to be maintained in its neutral state. For this reason, the power transmission controlling apparatus is provided with an electronic control unit (hereinafter simply referred to as "ECU") which can reliably control the changing operation between the High and Low modes while acquiring transmission information from the main transmission.

As one of the conventional power transmission controlling apparatuses, well known is an apparatus which is adapted to set allowable operation conditions for judging a cruising speed of an automotive vehicle, a brake condition of the vehicle, shifted range positions selected in the main transmission, and engine revolutions to allow the auxiliary transmission to perform the changing operation of the High and Low modes (hereinafter simply referred to as "H/L change"), and to always check whether or not a time period at which the allowable changing conditions of the H/L change on the above four items continue to be established ends passing more than a predetermined time. The above checking operations render it possible to quickly execute the H/L change only with the continuous judgment on whether or not the conditions of the H/L change are established as being allowable at the request of the mode change initiated by a mode change switch. The known apparatus thus constructed is disclosed in Japanese Patent Application Laid-Open Publication No. 2001-287557.

As additional one of the conventional power transmission controlling apparatuses, there is known an apparatus which is designed to detect a fail state generated out of a neutral state required for the H/L change of the auxiliary transmission due to abnormal states such as a valve stick, and then to prohibit the H/L change of the auxiliary transmission in the transfer at the time of the detection of the fail state. This known apparatus thus constructed is disclosed in Japanese Patent Application Laid-Open Publication No. 2003-336740.

The other prior-art power transmission controlling apparatus is operative to automatically return a transfer changing lever to its original position to be taken before the H/L change when the main transmission is out of its neutral state, for example, shifted in "D-range" even if the transfer changing lever is operated for changing means to perform the H/L change. The apparatus thus constructed is disclosed in Japanese Patent Application Laid-Open Publication No. 10-181373.

In the conventional power transmission controlling apparatuses previously mentioned, the main transmission is apt to be erroneously shifted by a driver to a non-neutral position such as "D-range" after the H/L change operation of the auxiliary transmission is initiated so that there is frequently caused an unallowable operation condition established, i.e., a violated condition for the auxiliary transmission at the time when the auxiliary transmission starts to be operated. As a result, the auxiliary transmission is brought into a state in which the main transmission starts the power transmitting operation before the H/L changing gears forming part of the auxiliary transmission are meshed with each other for the H/L change operation of the auxiliary transmission. Also in the conventional apparatuses one of which is constructed to prohibit the H/L change operation of the auxiliary transmission when the violated condition is established for the auxiliary transmission and the other of which is designed to return the changing members and elements forming part of the auxiliary transmission to their respective original positions to be taken before the H/L change operation, there are caused unpleasant gear noises, thereby lowering a durability of the auxiliary transmission.

To overcome the above problems, there has been proposed information medium for example such as owner's manuals and notice labels to pay attention to the driver on the use of the four-wheel drive vehicle, or a buzzer to be operated when the main transmission is shifted to a non-neutral position during the H/L change operation to prevent the violated condition from being generated or to urge the main transmission to quickly be shifted to the neutral position at the time of the violated condition occurring. These preventive measures and means for overcoming problems as to the gear noises cannot completely eliminate such annoying gear noises from the auxiliary transmission.

To prevent the gear noises from being generated in the auxiliary transmission, it is considered to prohibit the shifting operations of the main transmission during the H/L change operation of the auxiliary transmission, however, such consideration cannot be applied to a manual operation type of power transmission mechanism. Moreover, in the event that the transfer has entered a H/L change state and encountered an abnormal situation to have the auxiliary transmission unable to perform the H/L change operation, it is likely that the transmission operation by the main transmission is difficult to be carried out. The difficult transmission operation thus caused is not suitable for a limp-home function and a fail-safe function to be effected by the main transmission.

SUMMARY OF THE INVENTION

It is, therefore, an object of the present invention to provide a power transmission controlling apparatus, which enables the auxiliary transmission to perform a smooth and stable H/L change operation of the auxiliary transmission with no unpleasant gear noises without imparting limitation to the front stage operation like the operation of the main transmission even though there is caused a violated front stage operation during the H/L change operation of the auxiliary transmission.

It is another object of the present invention to provide a power transmission controlling apparatus which can enhance durability of the auxiliary transmission.

In accordance with one aspect of the present invention, there is provided a power transmission controlling apparatus for controlling a power transmission mechanism to change a drive power inputted therein and output the changed drive power in any one of a high speed output state to output the drive power at a high speed, and a low speed output state to output the drive power at a low speed output state, the power transmission controlling apparatus, comprising: changing command means for outputting a changing command to change one of the high speed output state and the low speed output state into the other of the high speed output state and the low speed output state; changing means for performing a changing operation to change one of the high speed output state and the low speed output state into the other of the high speed output state and the low speed output state with the changing command outputted by the changing command means; first judging means for judging whether or not the changing operation of the changing means is under an allowable changing condition preliminarily set based on the operation states of the power transmission mechanism in the time period from a starting time to a releasing time, the starting time being indicative of having the power transmission mechanism start the changing operation, and the releasing time being indicative of having the power transmission mechanism released from the high speed output state and the low speed output state; and returning means for returning the power transmission mechanism to its starting state held at the starting time when the first judging means judges in the time period that the changing operation of the changing means is brought out of the allowable changing condition after the changing means starts the changing operation.

The above construction of the power transmission controlling apparatus leads to the fact that even if there is generated violated conditions against the allowable changing condition during the changing operation of the power transmission mechanism, the power transmission mechanism can be returned to its starting state held at the starting time when the first judging means judges in the time period that the changing operation of the changing means is brought out of the allowable changing condition, viz., violated against the allowable changing condition after the changing means starts the changing operation. This means that the power transmission mechanism is by no means returned to its starting state after the power transmission mechanism is released from the high speed output state and the low speed output state, thereby making it possible to reliably prevent unpleasant gear noises giving rise in the conventional power transmission controlling apparatus from being caused.

In the power transmission controlling apparatus according to the present invention, the power transmission mechanism may be operative to assume a neutral state to output no drive power between the high speed output state and the low speed output state. The power transmission mechanism may further comprise: second judging means for judging whether or not the changing operation of the changing means is under the allowable changing condition after the releasing time of the changing operation by the changing means; retaining means for retaining the power transmission mechanism in the neutral state after the power transmission mechanism is released from one of the high speed output state and the low speed output state and before the power transmission mechanism is changed into the other of the high speed output state and the low speed output state when the second judging means judges that the changing operation of the changing means is out of the allowable changing condition; and informing means for informing violation conditions with an alarm output indicative of the changing operation violated against the allowable changing condition when the second judging means judges that the changing operation of the changing means is out of the allowable changing condition.

The above construction of the power transmission controlling apparatus results in the fact that, when the changing operation of the changing means is out of the allowable changing condition after the power transmission mechanism is released from one of the high speed output state and the low speed output state, the power transmission mechanism is retained by the retaining means in the neutral state and the violation conditions with an alarm output indicative of the changing operation violated against the allowable changing condition are informed by the informing means to ensure the releasing operation of releasing the violation conditions by a driver.

In the power transmission controlling apparatus according to the present invention, the first judging means may have a memory for preliminarily memorizing the time period from the starting time to the releasing time and operative to judge by at least one time in the time period whether or not the changing operation of the changing means is under the allowable changing condition.

According to the power transmission controlling apparatus constructed above, the time period can be set in consideration of deviations of the parts and elements assembled in the power transmission mechanism and the power transmission controlling apparatus and the deviated times required for the changing operation of the power transmission mechanism. This means that the power transmission controlling apparatus can obtain information about the time at which the changing operation of the power transmission mechanism is finished and can prevent the unpleasant gear noises with certainty. As a consequence, the power transmission controlling apparatus does not need any detector for detecting the position where the power transmission mechanism is released from the high speed output state and the low speed output state.

In the power transmission controlling apparatus according to the present invention, the power transmission mechanism may have a high speed side member formed with a high speed side spline, a low speed side member formed with a low speed side spline, and a changing member formed with first and second changing splines engageable selectively with the high speed side spline of the high speed side member and the low speed side spline of the low speed side member, respectively, the changing member being operative to have the power transmission mechanism operated in the high speed output state when the first changing spline of the changing member is engaged with the high speed side splines of the high speed side member, and to have the power transmission mechanism operated in the low speed output state when the second changing spline of the changing member is engaged with the low speed side spline of the low speed side member, the time period being indicative of a movement time for the changing member to move from the starting time to the releasing time.

According to the power transmission controlling apparatus constructed above, the time required for the changing operation of the changing member until the releasing operation is completed can easily and reliably set. The time can be decided by the movement distance and the movement speed of the changing sleeve until the changing sleeve is disengaged from the high and low speed side members.

In the power transmission controlling apparatus according to the present invention, the changing means may include an actuator unit to operate the changing member.

According to the power transmission controlling apparatus constructed above, the returning operation of the returning means and the retaining operation of the retaining means can be executed by the actuator unit for performing the changing operation of the changing means, thereby making it possible for the power transmission controlling apparatus to be simple in construction.

In the power transmission controlling apparatus according to the present invention, the power transmission mechanism may be constituted by an auxiliary transmission positioned at the rear stage of a main transmission and drivably connected with the main transmission, the auxiliary transmission being operative in the high speed output state, the low speed output state and the neutral state, and the allowable changing condition being preliminarily set based on the operation states of the main transmission.

According to the power transmission controlling apparatus constructed above, the gear noises are reliably prevented without limiting the operation of the main transmission when the violation conditions are generated in the case that the auxiliary transmission is used together with the main transmission.

The power transmission controlling apparatus according to the present invention may further comprises: third judging means for judging whether or not the changing operation of the changing means is under the allowable changing condition when the power transmission mechanism is retained in the neutral state by the retaining means, the power transmission mechanism being operative to have the changing means resume the changing operation when the third judging means judges that the changing operation of the changing means is under the allowable changing condition.

According to the power transmission controlling apparatus constructed above, the changing means can resume the changing operation when the third judging means judges that the changing operation of the changing means is under the allowable changing condition in the neutral state of the power transmission mechanism after the changing operation of the power transmission mechanism is finished. The resumption of the changing operation by the changing means results in the fact that the driver can quickly respond his or her request to perform the changing operation.

BRIEF DESCRIPTION OF THE DRAWINGS

The foregoing and other objects, features, aspects and advantages of the present invention will become more apparent from the following detailed description of the present invention when taken in conjunction with the accompanying drawings, wherein.

DETAILED DESCRIPTION OF THE PREFERRED EMBODIMENT

One preferred embodiment of the power transmission controlling apparatus according to the present invention will hereinafter be described in detail with reference to the accompanying drawings.

Figure 1:
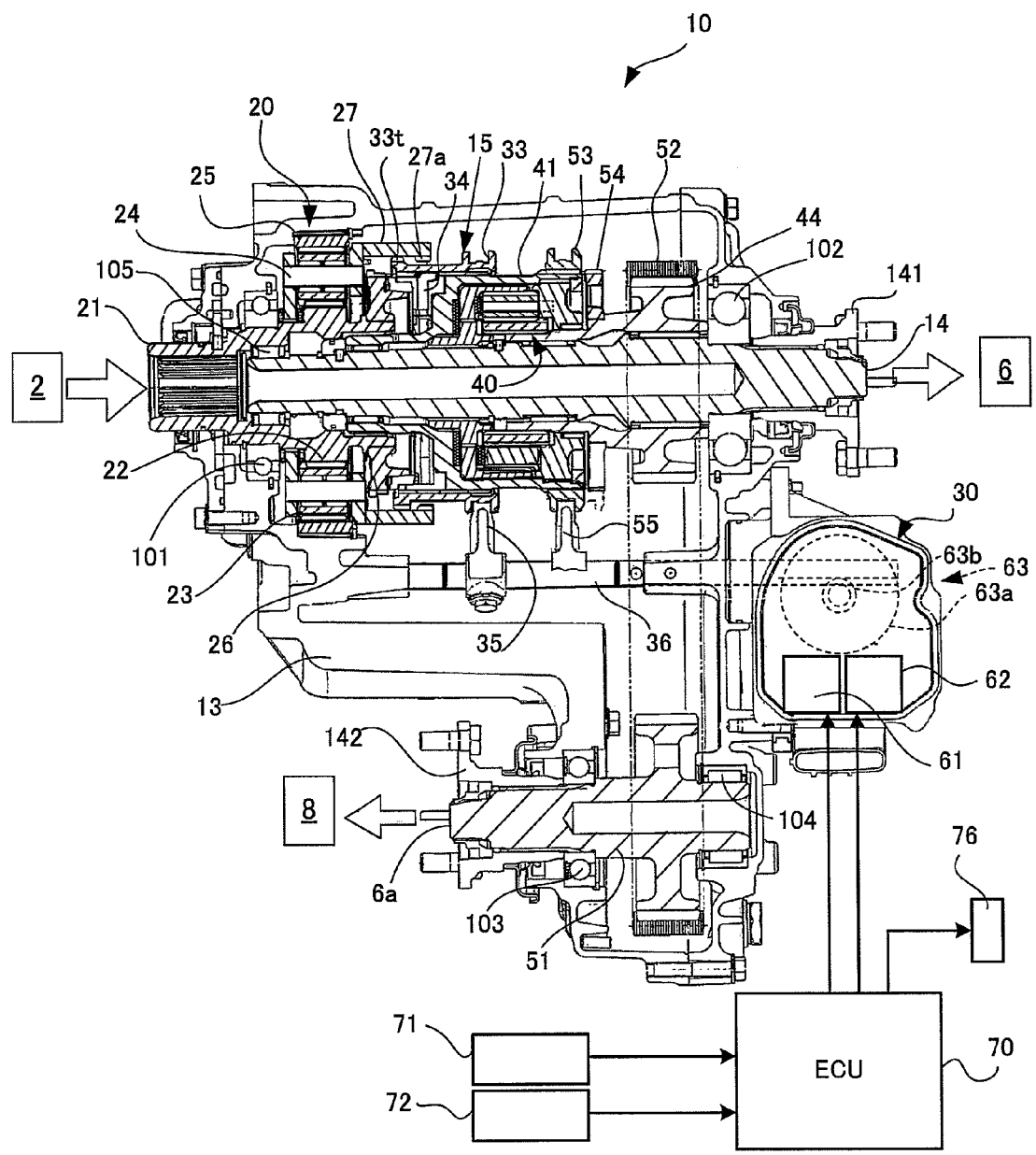
FIG. 1 is a fragmentary cross-sectional view of a transfer, partly showing a block diagram of a power transmission controlling apparatus according to one preferred embodiment of the present invention.
Figure 2A:
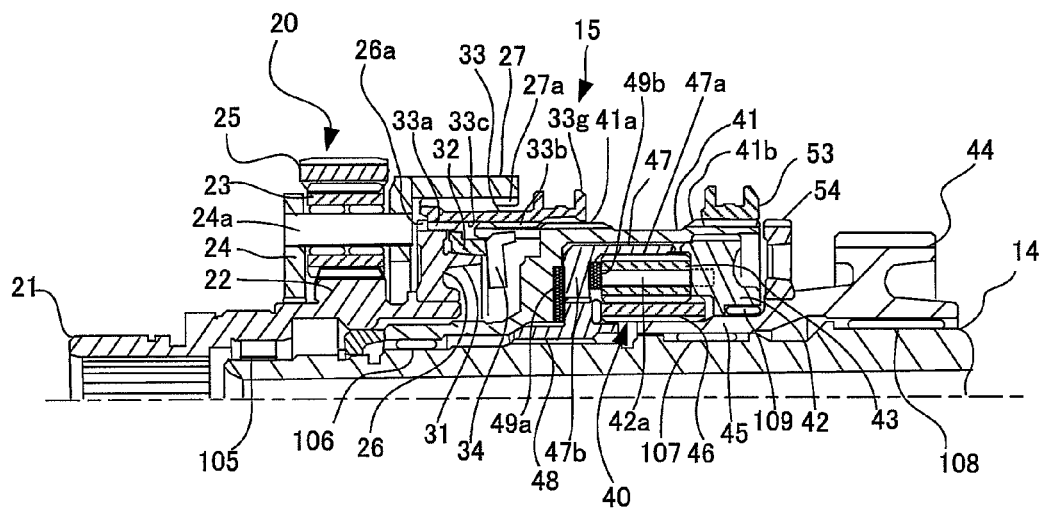
FIG. 2(a) and FIG. 2(b) respectively illustrate fragmentary cross-sectional views of an upper half of the transfer including an auxiliary transmission to be controlled by the power transmission controlling apparatus according to the preferred embodiment of the present invention, FIG. 2(a) showing a high speed stage changed by the auxiliary transmission while FIG. 2(b) showing a low speed stage changed by the auxiliary transmission.
Figure 2B:
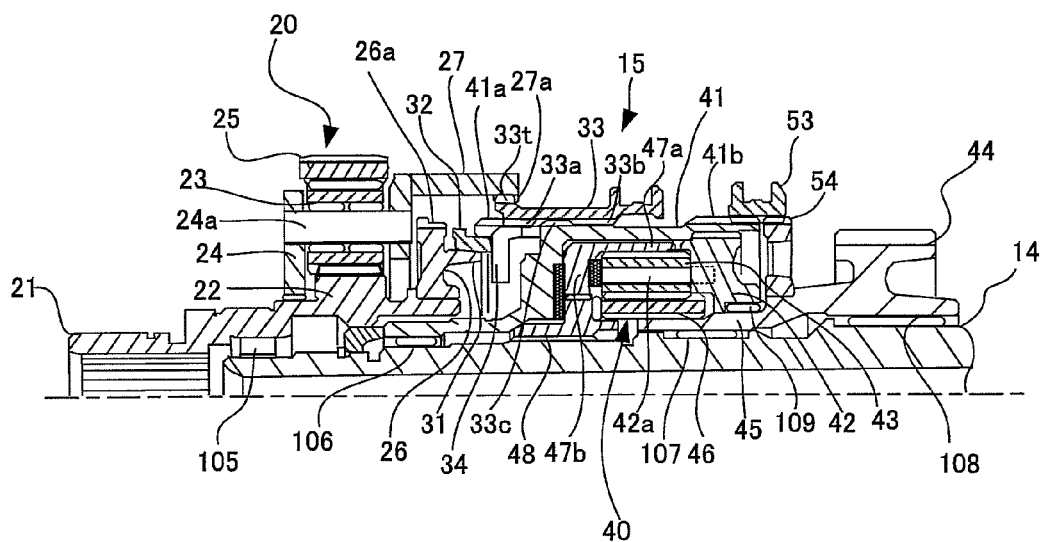
Figure 3:
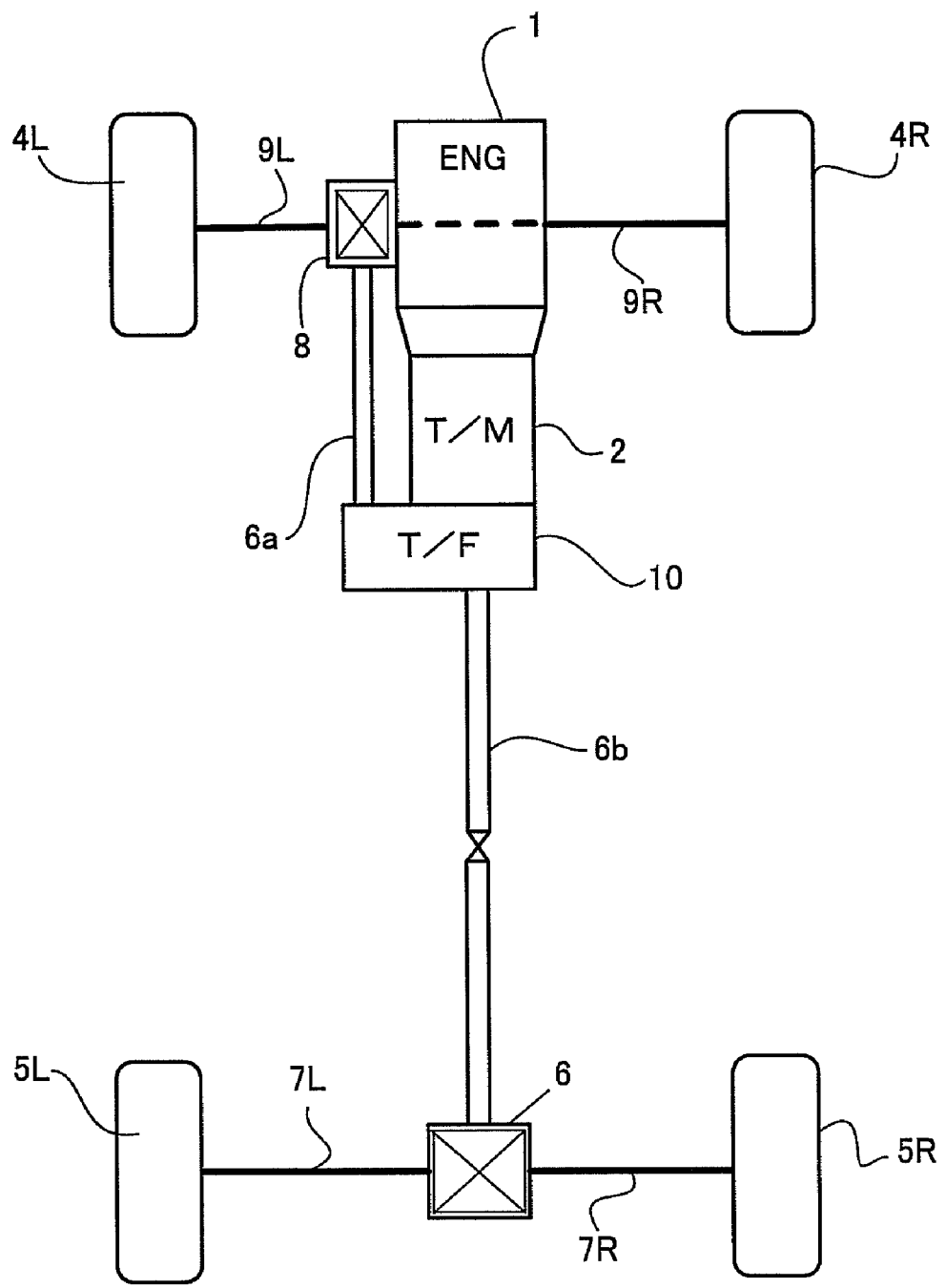
FIG. 3 is a plan view schematically showing a four-wheel drive vehicle to be controlled by the power transmission controlling apparatus according to the preferred embodiment of the present invention.

FIGS. 1 to 3 show one preferred embodiment of a power transmission controlling apparatus according to the present invention.

FIG. 1 is a fragmentary cross-sectional view of a transfer. FIG. 2(a) and FIG. 2(b) respectively illustrate fragmentary cross-sectional views of an upper half of the transfer, FIG. 2(a) showing a high speed stage changed by the auxiliary transmission while FIG. 2(b) showing a low speed stage changed by the auxiliary transmission. FIG. 3 is a plan view schematically showing a four-wheel drive vehicle to be controlled by the power transmission controlling apparatus according to the preferred embodiment of the present invention.

In FIG. 3, there are shown an engine 1, a main transmission 2, and a transfer 10 which are arranged in series and drivably connected with one another so that the drive power outputted from the engine 1 is transmitted to the transfer 10 through the main transmission 2. The transfer 10 is operative to distribute and transmit the drive power to the front left and right drive wheels 4L, 4R through a propeller shaft 6a, a differential gear device 8 and drive shafts 9L, 9R, and to the rear left and right drive wheels 5L, 5R through a propeller shaft 6b, a differential gear device 6 and drive shafts 7L, 7R.

The main transmission 2 shown in FIG. 1, FIG. 2(a) and FIG. 2(b) is of an automatically operated transmission type and operative in a plurality of shift ranges including forward drive ranges D, L, 2, a rear drive range R, a parking range P and a neutral range N which can be selected by a driver depending upon his or her driving requests. The main transmission 2 is adapted to perform an automatic speed change control in response to the selected ranges to drive a motor vehicle. The main transmission 2 is well known in the art and thus the particulars thereof will not be described hereinafter.

The transfer 10 comprises an auxiliary transmission 20 positioned at the rear stage of the main transmission 2 and capable of performing a changing operation to change the drive power inputted therein from the main transmission 2 through an input shaft 21 to output the changed drive power in any one of a high speed output state and a low speed output state. The high speed output state is indicative of outputting the changed drive power at a high speed through an output shaft 14, while the low speed output state is indicative of outputting the changed drive power at a low speed through the output shaft 14. It is thus to be noted that the auxiliary transmission 20 constitutes a power transmission mechanism defined in the present invention.

Here, the high speed output state and the low speed output state are hereinafter simply referred to as "High mode" and "Low mode", respectively. The transfer 10 further comprises a synchronizing mechanism 15 for operating the auxiliary transmission 20 to perform the above changing operation, an actuator unit 30 for operating the auxiliary transmission 20 through the synchronizing mechanism 15, and a center differential 40 constituted by a planetary gear type of differential device to be operated with limited differential functions.

The synchronizing mechanism 15, the auxiliary transmission 20, the actuator unit 30, and the center differential 40 are housed in a transfer case 13. The input shaft 21 is rotatably supported by the transfer case 13 through a ball bearing 101, while the output shaft 14 is rotatably supported by the transfer case 13 through a ball bearing 102. The input shaft 21 has formed therein an axial bore axially extending and rotatably receiving the forward end portion of the output shaft 14 to ensure that the input shaft 21 and the output shaft 14 are relatively rotated with respect to each other through a bearing 105.

The auxiliary transmission 20 is shown in FIG. 1, FIG. 2(*a*) and FIG. 2(*b*) as being of a planetary gear type, and thus comprises a sun gear 22 integrally formed with the input shaft 21 splined to an output shaft, not shown, of the main transmission 2, and a plurality of pinion gears 23 circumferentially equidistantly arranged around the sun gear 22 and held in meshing engagement with the sun gear 22, and a pinion carrier 24 having a plurality of pinion shafts 24*a* respectively rotatably supporting the pinion gears 23, and a ring gear 25 securely connected to the inner peripheral portion of the transfer case 13 in meshing engagement with the pinion gears 23. The pinion carrier 24 has a radially outer end portion integrally formed with and securely supporting a cylindrical body 27 axially extending in coaxial relationship with the output shaft 14.

The cylindrical body 27 has an axial free end inner peripheral portion formed with a body spline 27*a*. The auxiliary transmission 20 thus constructed is operative to have the drive power of the input shaft 21 transmitted to the cylindrical body 27 at an increased torque and at a reduced speed, for example, one revolution of the cylindrical body 27 with respect to 2.6 revolutions of the input shaft 21.

The input shaft 21 has an axial end outer peripheral portion axially extending in the neighborhood of the sun gear 22 and securely supporting a high speed stage wheel 26. The high speed stage wheel 26 is thus rotated together with the input shaft 21 to output a drive power at a rotation speed. The drive power and the rotation speed of the high speed stage wheel 26 are the same as those of the input shaft 21.

The high speed stage wheel 26 has an outer peripheral portion formed with a wheel spline 26*a*. The wheel spline 26*a* of the high speed stage wheel 26 and the body spline 27*a* of the cylindrical body 27 are axially spaced apart from each other. The high speed stage wheel 26 and the cylindrical body 27 are radially spaced apart from each other to form therebetween an annular space in which a changing member 33 forming part of the synchronizing mechanism 15 is partly received and axially movable with respect to the high speed stage wheel 26 and the cylindrical body 27. The changing member 33 will become apparent as the description proceeds hereinafter. Each of the sun gear 22, the pinion gears 23, and the ring gear 25 is of a helical gear type.

It is thus to noted that the high speed stage wheel 26 and the wheel spline 26*a* described above respectively constitute a high speed side member and a high speed side spline defined in the present invention, and that the cylindrical body 27 and the body spline 27*a* described above respectively constitute a low speed side member and a low speed side spline defined in the present invention.

The synchronizing mechanism 15 is of a lever synchronization type and thus comprises a tapered ring 31 axially extending from the wall portion of the high speed stage wheel 26 remote from the pinion gears 23 and integrally formed with the high speed stage wheel 26. The tapered ring 31 has an outer peripheral surface tapered toward the center axis of the output shaft 14 which has one end portion close to the sun gear 22 and received in the input shaft 21 in coaxial relationship with the input shaft 21. The synchronizing mechanism 15 further comprises a synchronizer ring 32 axially slidably mounted on the tapered ring 31, and a set of synchro levers 34 each having a radially outer end portion loosely received in the changing member 33 and an radially inner end portion supported by a resilient member such as a plate spring, not shown in the drawings. The synchronizing mechanism 15 further comprises a shift fork 35 having a free end portion held in slidable engagement with an annular grooved portion 33*g* formed on the outer peripheral portion of the changing member 33 to have the changing member 33 axially moved toward and away from the pinion carrier 24, and a shift shaft 36 fixedly supporting the shift fork 35 and axially slidably supported on the transfer case 13.

The synchronizing mechanism 15 further comprises a changing member 33 having axial end inner peripheral portions formed with first and second inner splines 33*a*, 33*b* respectively close to and remote from the pinion carrier 24 and thus axially spaced apart from each other along the center axis thereof and an axially intermediate inner peripheral portion formed with an annular groove 33*c* between the first and second inner splines 33*a*, 33*b*.

The first inner spline 33*a* of the changing member 33 is engageable with the wheel spline 26*a* of the high speed stage wheel 26. When the first inner spline 33*a* of the changing member 33 is held in engagement with the wheel spline 26*a* of the high speed stage wheel 26, the changing member 33 can be rotated together with the high speed stage wheel 26 at a rotation speed the same as that of the high speed stage wheel 26 as shown in FIG. 2(*a*).

In this embodiment, the engagement between the first inner spline 33*a* of the changing member 33 and the wheel spline 26*a* of the high speed stage wheel 26 is smoothly performed by the synchronizer ring 32 and the synchro lever 34.

The changing member 33 has an axial end outer peripheral portion in vicinity of the pinion carrier 24 and formed with an outer spline 33*t* engageable with the body spline 27*a* of the cylindrical body 27 to ensure that the changing member 33 is rotated together with the cylindrical body 27 at a reduced rotation speed when the outer spline 33*t* of the changing member 33 is engaged with the body spline 27*a* of the cylindrical body 27 as shown in FIG. 2(*b*).

It is thus to be noted that the first inner spline 33*a* and the outer spline 33*t* of the changing member 33 above respectively constitute first and second changing splines of a changing member defined in the present invention.

The transfer 10 comprises a center differential 40 which includes a housing 41, a pinion carrier 42, a plurality of pinion gears 43, a chain sprocket 44, a front side output member 45, a sun gear 46, a ring gear 47, an inner cylindrical member 48, and annular shims 49a, 49b. The housing 41 has an axial end portion extending toward the sun gear 22 and partly received between the output shaft 14 and the input shaft 21 and rotatably supported on the output shaft 14 through bearings 106.

The housing 41 has a first axial end outer peripheral portion close to the pinion carrier 24 and formed with a first housing spline 41a, and a second axial end outer peripheral portion remote from the pinion carrier 24 and formed with a second housing spline 41b. The first housing spline 41a is engageable with the first and second inner splines 33a, 33b of the changing member 33 so that the housing 41 is rotated together with the changing member 33 when the first housing spline 41a is engaged with the first and second inner splines 33a, 33b of the changing member 33 as shown in FIG. 2(b). The second housing spline 41b will hereinafter be described in detail.

From the foregoing description, it is to be understood that the drive power of the high speed stage wheel 26 is transmitted to the housing 41 through the changing member 33 when the first inner spline 33a of the changing member 33 is engaged with the wheel spline 26a of the high speed stage wheel 26, the second inner spline 33b of the changing member 33 being engaged with the housing spline 41a of the housing 41, and the outer spline 33t of the changing member 33 being disengaged from the body spline 27a of the cylindrical body 27 as shown in FIG. 2(a), while the drive power of the cylindrical body 27 is transmitted to the housing 41 through the changing member 33 when the outer spline 33t of the changing member 33 is engaged with the body spline 27a of the cylindrical body 27, the second inner spline 33b of the changing member 33 being engaged with the housing spline 41a of the housing 41, and the first inner spline 33a of the changing member 33 being disengaged from the wheel spline 26a of the high speed stage wheel 26 as shown in FIG. 2(b). The engagement between the first inner spline 33a of the changing member 33 and the wheel spline 26a of the high speed stage wheel 26 can establish a high speed output state for the auxiliary transmission 20 to output the drive power at a high speed, while the engagement between the outer spline 33t of the changing member 33 and the body spline 27a of the cylindrical body 27 can also establish a low speed output state for the auxiliary transmission 20 to output the drive power at a low speed.

The pinion carrier 42 has an outer peripheral portion formed with spline teeth engaged with spline teeth formed on the axial end inner peripheral portion of the housing 41 remote from the pinion carrier 24 and is arranged in coaxial relationship with the output shaft 14 to close one end of the ring gear 47. The pinion carrier 42 is rotatably supported on the front side output member 45 through a bearing 109 in such a manner that the pinion carrier 42 is prevented from being axially moved out of the housing 41. The pinion gears 43 are circumferentially equi-angularly arranged around the sun gear 46 and rotatably supported on the pinion carrier 42 through respective pinion shafts 42a. The pinion gears 43, the sun gear 46 and the ring gear 47 are each in the form of a helical gear type having helical teeth. The front side output member 45 is securely connected with the chain sprocket 44 for driving the front wheels 4L, 4R and rotatably supported on the output shaft 14 through a bearing 107. The sun gear 46 is splined to the front side output member 45 and held in meshing engagement with the pinion gears 43. The ring gear 47 has an inner peripheral portion formed with an inner gear 47a held in meshing engagement with the pinion gears 43, and an annular plate portion 47b integrally formed with the axial end portion of the ring gear 47 facing the radially inwardly extending portion of the housing 41. The inner cylindrical member 48 has an outer annular projection portion extending radially outwardly toward the annular plate portion 47b of the ring gear 47 and splined to the annular plate portion 47b of the ring gear 47, and an inner peripheral portion splined to the output shaft 14. The annular shim 49a is positioned between the radially inwardly extending portion of the housing 41 and the outer annular projection portion of the inner cylindrical member 48, the annular plate portion 47b of the ring gear 47, while the annular shim 49b is positioned between the annular plate portion 47b of the ring gear 47 and the pinion gears 43.

The chain sprocket 44 securely connected with the front side output member 45 is drivably connected with a chain sprocket 51 through an endless chain 52 passed on the chain sprockets 44 and 51 to drive the front side propeller shaft 6a through the chain sprocket 51. The chain sprocket 51 is rotatably supported on the transfer case 13 through bearings 103, 104.

The center differential 40 thus constructed is operative to output two different output drive powers in a first output state in which the drive power received by the housing 41 is transmitted to the front side output member 45 and the chain sprocket 44 through the pinion carrier 42, the pinion gears 43 and the sun gear 46 and in a second output state in which the drive power of the housing 41 is transmitted to the output shaft 14 through the ring gear 47 and the inner cylindrical body 48. This means that the center differential 40 serves to bring about a differential motion between the front drive chain sprocket 44 rotated together with the sun gear 46 and the output shaft 14 rotated together with the ring gear 47. The fact that the pinion gears 43, the sun gear 46 and the ring gear 47 are respectively constructed by helical gears and held in meshing engagement with one another results in the fact that an axial thrust force is generated toward the radially inwardly extending portion of the ring gear 47 to axially urge the annular shims 49a, 49b toward the radially inwardly extending portion of the housing 41. The axial urging forces of the annular shims 49a, 49b cause a frictional contact between the annular shims 49a, 49b and the radially inwardly extending portions of the housing 41 and the ring gear 47, which in turn allow the center differential 40 to be operated with a limited differential function to have the differential motion of the center differential 40 performed in a limited range.

The second housing spline 41b formed on the axial end outer peripheral portion of the housing 41 remote from the pinion carrier 24 is held in engagement with an inner spline formed on the inner peripheral portion of an annular differential lock sleeve 53. The front side output member 45 has a toothed wheel 54 fixedly supported thereon in facing and spaced relationship with the pinion carrier 42. The toothed wheel 54 has an outer peripheral portion formed with an outer spline juxtaposed with and in close proximity of the second housing spline 41b of the housing 41. The annular differential lock sleeve 53 is axially movable with respect to the housing 41 and the toothed wheel 54 between a differential lock state where the inner spline of the annular differential lock sleeve 53 is engaged with the second housing spline 41b of the housing 41 and the outer spline of the toothed wheel 54, and a differential unlock state where the inner spline of the annular differential lock sleeve 53 is engaged with the second housing spline 41b of the housing 41 and disengaged from the outer spline of the toothed wheel 54.

It will be understood from the previously mentioned description that the housing 41 and the chain sprocket 44 are rotated together with each other when the annular differential lock sleeve 53 is in the differential lock state, while the housing 41 and the chain sprocket 44 are independently rotated when the annular differential lock sleeve 53 is in the differential unlock state.

Accordingly, the annular differential lock sleeve 53 in the differential lock state can drive the propeller shafts 6a, 6b with no differential motion, while the annular differential lock sleeve 53 in the differential unlock state can drive the propeller shafts 6a, 6b with a differential motion.

The annular differential lock sleeve 53 is axially moved to assume the differential lock and unlock states, i.e., def-lock ON/OFF by an actuator unit 30 through a shift fork 55 having one end portion held in slidable engagement with the annular differential lock sleeve 53 and the other end portion fixedly supported on a shift shaft not shown but axially slidably supported on the transfer case 13 in parallel with the shift shaft 36.

The output shaft 14 and the propeller shaft 6b are drivably connected with each other by a front side bracket 141 and a rear side bracket (not shown), respectively, which are securely coupled with each other by fastening means such as for example bolts and nuts and are respectively splined to the rear end portion of the output shaft 14 and the forward portion of the propeller shaft 6b. The chain sprocket 51 has an axial extension portion extending toward the propeller shaft 6a. The propeller shaft 6a and the axial extension portion of the chain sprocket 51 are drivably connected with each other by a front side bracket (not shown) and a rear side bracket 142, respectively, which are securely coupled with each other by fastening means such as for example bolts and nuts and are respectively splined to the rear end portion of the propeller shaft 6a and the axial extension portion of the chain sprocket 51.

The description will then be made about the power transmission controlling apparatus for controlling the changing operation of the auxiliary transmission 20 incorporated in the transfer 10.

The power transmission controlling apparatus is shown in FIG. 1 as comprising an actuator unit 30 which includes a pair of electronically operated pulse motors 61, 62 for driving the shift forks 35, 55 respectively to have the shift forks 35, 55 take their respective operation positions, a driving mechanism 63 operative to reduce the rotation speeds of the pulse motors 61, 62 and to convert the rotation motions of the pulse motors 61, 62 into linear motions, respectively, and a plurality of detectors, not shown, for detecting the rotations of the pulse motors 61, 62 before the reduction of the rotation speeds of the pulse motors 61, 62, or the rotations or the linear motion output of the pulse motors 61, 62 after the reductions of the rotation speeds of the pulse motors 61, 62. The driving mechanism 63 is constituted by a worm wheel device 63a and a rack-pinion device 63b capable of converting the rotation motions of the pulse motors 61, 62 into the linear motions. The worm wheel device 63a and the rack-pinion device 63b are well known in the art, and thus the descriptions thereof will hereinafter be omitted.

The pulse motors 61, 62 of the actuator unit 30 are controlled by an electronic control unit (hereinafter simply referring to as "ECU") 70 for controlling the transfer 10, viz., the operation of the auxiliary transmission 20 and the operation of the center differential 40. The synchronizing mechanism 15, the actuator unit 30 and the ECU 70 constitute as a whole changing means for changing the High-Low speeds of the auxiliary transmission 20.

The ECU 70 is provided with for example CPU (Central Processing Unit), ROM (Read Only Memory), RAM (Random Access Memory), and B-RAM (Back-up RAM) forming a back-up memory operative with a battery, but no detailed hard construction thereof will hereinafter be explained. The ECU 70 further comprises an input interface circuit having an A/D converter, an output interface circuit having a relay circuit and the like, and a communication interface for allowing communications between another ECU for controlling the engine 1 and the main transmission 2, and a supervisory control computer for the total system control. The ECU 70 may constitute part of a transmission control computer.

The input interface circuit of the ECU 70 has a high-low speed change switch 71 and a differential lock-unlock switch 72 provided in a passenger room of the motor vehicle not shown in the drawings. Here, the high-low speed change switch 71 constitutes changing command means for outputting a changing command when a driver requests a changing operation to the auxiliary transmission 20 to change one of the high speed output state (High mode) and the low speed output state (Low mode) into the other of the high speed output state and the low speed output state. The communication interface of the ECU 70 is designed to be inputted, from the ECU for controlling the main transmission 2, information about a range signal indicative of a selected range from among the operation ranges "D", "L", "2", "R", "N" and "P" of the main transmission 2 and the cruising speeds of the motor vehicle. More specifically, the ECU 70 functions to detect a command signal indicative of a request to the transfer mode change (the mode change of the auxiliary transmission) in cooperation with the high-low speed change switch 71, cruising speeds, and the operation states of the main transmission 2 including driving and non-driving connections with the engine, and shifted positions of the main transmission.

The ROM of the ECU stores therein a control program to change the transfer modes. In compliance with the control program, the ECU is operative to input information regarding the cruising state of the motor vehicle like the cruising speeds, and inputted, as commands from a driver, position signals indicative of shift ranges of the main transmission 2, and the positions of the high-low speed change switch 71 and the differential lock-unlock switch 72. The ECU 70 is operative to judge whether the transfer modes are acceptable or not and then to control the pulse motors 61, 62 in the actuator unit 30 to have the shift forks 35, 55 move to their respective preliminarily decided positions.

The ECU 70 is operative in cooperation with the synchronizing mechanism 15 and the actuator unit 30 to start the changing operation of the auxiliary transmission 20 from one of the High and Low modes to the other of the High and Low modes when the high-low speed change switch 71 receives an operation command, and when the operation condition of the auxiliary transmission 20 is in an allowable changing condition preliminarily set to perform the changing operation between the High and Low Modes.

Here, the above allowable changing condition includes a cruising speed [km/h] and engine rotations [rpm] which are required to be within the preliminarily set respective values. The other factors of the allowable changing condition include a neutral range if the main transmission 2 of an automatic transmission vehicle is applied to this invention, and a clutch-off state if the main transmission 2 of a manual transmission vehicle is applied to this invention. This means that the ECU 70 allows the transfer mode changing operation to start for the purpose of preventing gear noises and protecting the synchronizing mechanism 15 only when the main transmission 2 is in the neutral range state in the case of the automatic transmission vehicle and in the clutch-off state in the case of the manual transmission vehicle.

In the case that the main transmission 2 falls into any one of the "D" range, the "R"and other non-neutral ranges and that the cruising speed of the motor vehicle or the revolutions of the engine 1 exceed the previously set respective values during the changing operation of the auxiliary transmission 20 even if the auxiliary transmission 20 starts to be operated with the operation condition of the auxiliary transmission 20 under the allowable changing condition, the operation condition of the auxiliary transmission 20 is judged by the judging means incorporated in the ECU 70 as being not under the allowable changing condition.

The ECU 70 has a function as first judging means for repeatedly judging whether or not the operation condition of the auxiliary transmission 20 is under the allowable changing condition from a starting time at which the auxiliary transmission 20 starts to be operated to a releasing time at which the auxiliary transmission 20 is released from one of the High and Low modes. The operation to have the auxiliary transmission 20 released from one of the High and Low modes is hereinafter simply referred to as the releasing operation. The ECU 70 has an additional function as returning means for returning the auxiliary transmission 20 to its starting position of the changing operation when the operation condition of the auxiliary transmission 20 is judged by the first judging means as being not under the allowable changing condition.

More specifically, the ECU 70 serving as the first judging means is adapted to preliminarily memorize in the ROM or the B-RAM a time period from the starting time at which the synchronizing mechanism 15 is operated to perform the changing operation to change one of the High and Low modes to the other of the High and Low modes of the auxiliary transmission 20 to the releasing time at which the auxiliary transmission 20 is released from either the High mode or the Low mode. The ECU 70 has a judging program stored in the ROM for judging by at least one time in the time period based on the memorized information whether or not the operation condition of the auxiliary transmission 20 is under the allowable changing condition.

As will be understood from the foregoing description, the fact that the changing member 33 of the synchronizing mechanism 15 has a first inner spline 33a and an outer spline 33t selectively engageable with the wheel spline 26a of the high speed stage wheel 26 and the body spline 27a of the cylindrical body 27, respectively, leads to the fact that the time period previously mentioned is indicative of an axial movement time of the changing member 33 from the starting time at which the changing member 33 starts to be axially moved to perform the changing operation to the releasing time at which the first inner spline 33a of the changing member 33 is disengaged and released from the wheel spline 26a of the high speed stage wheel 26. For example, in the case that the changing operation in the High mode in which the first inner spline 33a of the changing member 33 is engaged with the wheel spline 26a of the high speed stage wheel 26 is performed toward the Low mode in which the outer spline 33t of the changing member 33 is engaged with the body spline 27a of the cylindrical body 27, the time period previously mentioned is indicative of a time period from the starting time at which the changing operation of the changing member 33 starts to be operated to the releasing time at which the first inner spline 33a of the changing member 33 is disengaged and released from the wheel spline 26a of the high speed stage wheel 26 to allow the changing member 33 and the high speed stage wheel 26 to be drivably disconnected from each other.

According to the present invention, the time period required for the changing operation to be released from the High mode, viz., until the changing member 33 is released from the high speed stage wheel 26 is set in consideration of the axial movement speed of the changing member 33 (such as for example, the stroke speed of the actuator unit 30), the axial movement distance of the changing member 33 (corresponding to the engagement length of the high speed stage wheel 26 and the changing member 33) and the deviations of the elements and parts assembled into the auxiliary transmission and the controlling apparatus.

On the other hand, in the case that the changing operation in the Low mode in which the outer spline 33t of the changing member 33 is engaged with the body spline 27a of the cylindrical body 27 is performed toward the High mode in which the first inner spline 33a of the changing member 33 is engaged with the wheel spline 26a of the high speed stage wheel 26, the time period previously mentioned is indicative of a time period from the starting time at which the changing operation of the changing member 33 starts to be operated to the releasing time at which the outer spline 33t of the changing member 33 is disengaged and released from the body spline 27a of the cylindrical body 27 to allow the changing member 33 and the cylindrical body 27 to be drivably disconnected from each other.

According to the present invention, the time period required for the changing operation to be released from the Low mode, viz., until the changing member 33 is released from the cylindrical body 27 is set in consideration of the axial movement speed of the changing member 33 (such as for example, the stroke speed of the actuator unit 30), the axial movement distance of the changing member 33 (corresponding to the engagement length of the cylindrical body 27 and the changing member 33) and the deviations of the elements and parts assembled into the auxiliary transmission and the controlling apparatus.

It is thus to be noted that the time period can be set at an appropriate time for the changing operation of the changing member from the High mode to the Low mode and from the Low mode to the High mode according to the present invention.

In the present embodiment previously mentioned, the ECU 70 is operative, not only (1) to judge whether or not the main transmission 2 is operated to change from the neutral range "N" to any one of the cruising ranges including "D", "L", "2" and "R" ranges every predetermined time period during the changing operation of the auxiliary transmission 20, or (2) to judge whether or not the clutch coupled with the main transmission 2 is cut off, but also (3) to judge whether or not the cruising speed of the motor vehicle is below the allowable cruising speed previously set to the changing operation, and (4) to judge whether or not the engine rotations [rpm] is below the allowable engine rotations preliminarily set.

The ECU 70 functioning as the returning means is adapted to return the auxiliary transmission 20 to its starting position with the shift fork 35 and the shift shaft 36 returning their respective starting positions through the operation of the actuator unit 30 to reversely rotate the pulse motor 61 when the allowable changing condition to the changing operation of the auxiliary transmission 20 is not established, viz., the changing operation of the auxiliary transmission 20 is brought out of the allowable changing conditions preliminarily set in the time period from the starting time of the auxiliary transmission 20 to the releasing time of the auxiliary transmission 20 as a result of the judgment of the first judging means. For example, when the main transmission 2 is brought out of its neutral range, viz., selectively changed into any one of the other non-neutral ranges in the time period from the starting time to the releasing time during the time interval between the High mode to the Low mode of the auxiliary transmission 20, the auxiliary transmission 20 is returned to the Low mode, exactly to the starting position taken at the starting time. In the event of the condition violations generated against the cruising speed and the engine rotations of the motor vehicle, the auxiliary transmission 20 is returned to the Low mode in the manner similar to the above manner.

On the other hand, the ECU 70 is operative to continue the changing operation of the auxiliary transmission 20 from the starting time to the releasing time thereof when the allowable operation condition to the changing operation of the auxiliary transmission 20 is judged as continuing by the first judging means.

Further, the ECU 70 serves as second judging means to judge whether or not the allowable changing condition to the changing operation of the auxiliary transmission 20 is again established after the releasing operation is completed with the movement of the changing member 33, viz., after the lapse of the time period. When the allowable changing condition to the changing operation of the auxiliary transmission 20 is not established by the second judging means until the changing operation of the auxiliary transmission 20 is completed after the time period lapses, the ECU 70 functions as retaining means to retain the auxiliary transmission 20 in its neutral state in which the auxiliary transmission 20 is released from any one of the High and Low modes and is not changed into the other of the High and Low modes.

Further, the ECU 70 serves as third judging means for judging whether or not the allowable changing condition to the changing operation of the auxiliary transmission 20 is established when the auxiliary transmission 20 is retained by the retaining means in the neutral state in which the auxiliary transmission 20 is released from any one of the High and Low modes and is not changed into the other of the High and Low modes by the retaining means. When the allowable changing condition to the changing operation of the auxiliary transmission 20 is judged by the third judging means as being established, the auxiliary transmission 20 resumes the changing operation to have the auxiliary transmission 20 changed from any one of the High and Low modes into the other of the High and Low modes in corporation with the actuator unit 30 and the synchronizing mechanism 15.

When the allowable changing operation to the auxiliary transmission 20 is judged by the first and second judging means as being not established with the violation of the changing operation generated, the ECU 70 is operative to have a buzzer 76 inform violated conditions with an alarm output indicative of the changing operation violated against the allowable changing condition. The buzzer 76 constitutes informing means defined in the present invention.

The ECU 70 has a control program to perform the various functions previously mentioned, information regarding preliminarily set values, and a working memory area needed for operating the ECU 70. The above control program is stored in the ROM, and the set information on the values is also stored in the ROM or B-RAM. For example, the set values on the operation range, the operation speed, the operation timing and the other operational conditions of the shift fork 35 required for the judging the operation strokes and speeds of the changing member 33 are stored in the B-RAM of the ECU 70 together with information about the other various values preliminarily set. The RAM in the ECU 70 is assigned with a working memory area needed for the information about the various values.

The operation of the power transmission controlling apparatus according to the present invention will be described hereinafter.

Figure 4:
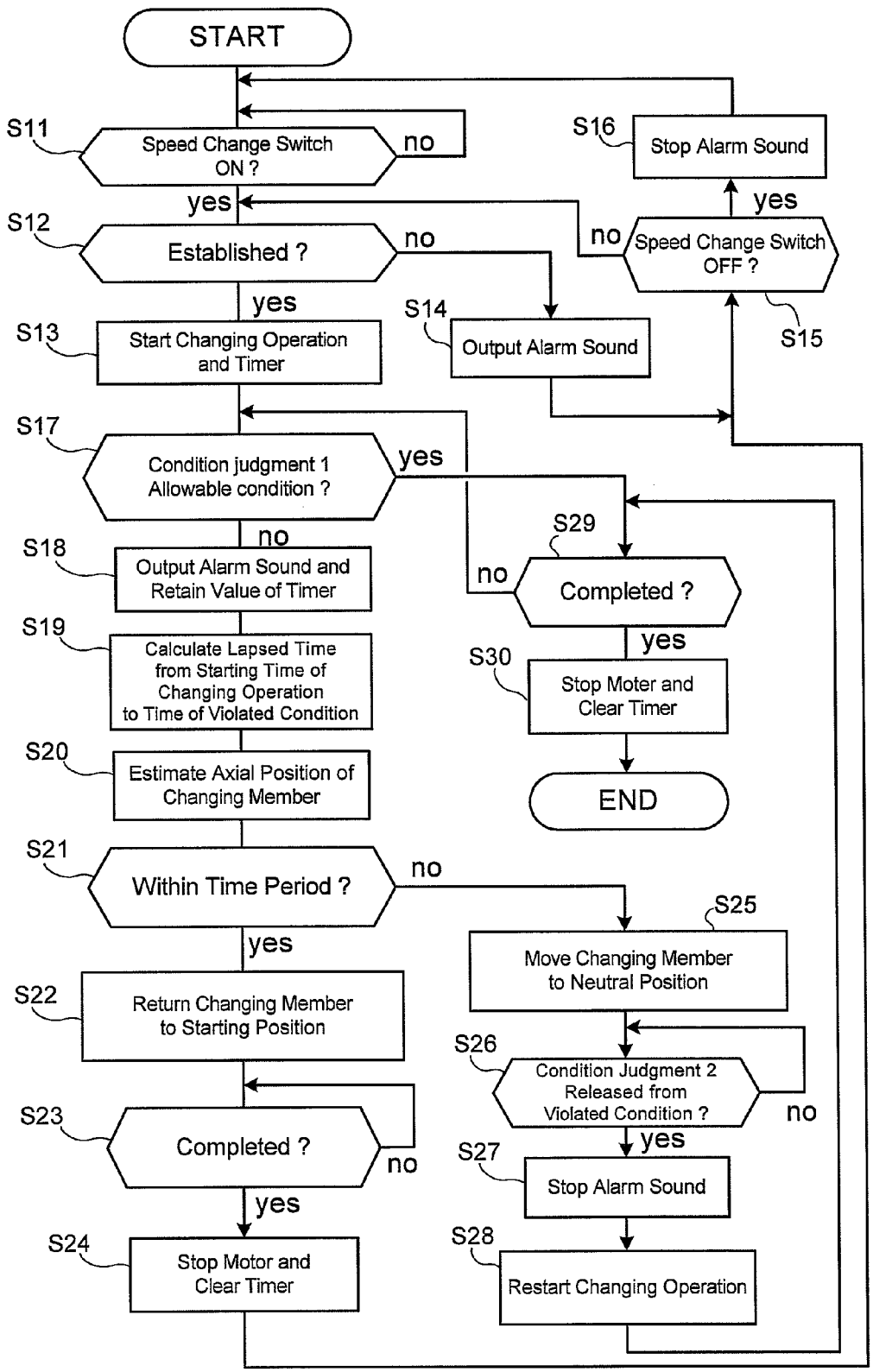
FIG. 4 is a flow chart showing an operational flow of the power transmission controlling apparatus according to the preferred embodiment of the present invention.
Figure 5A:
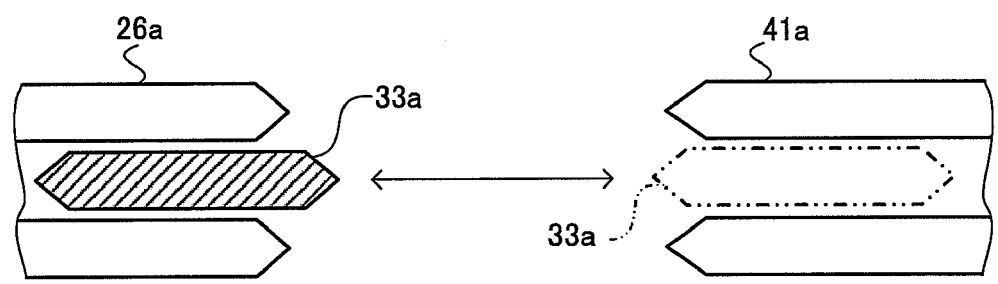
FIG. 5(a), FIG. 5(b) and FIG. 5(c) respectively illustrate explanatory views of splines formed on a changing member to be altered in engagement relationship by the power transmission controlling apparatus according to the preferred embodiment of the present invention, FIG. 5(a) showing a usual movement range of the changing member, FIG. 5(b) showing a returning direction of the changing member returning toward its original position when the power transmission controlling apparatus finds a violation condition within the time period of the operation thereof, and FIG. 5(c) showing a neutral position in phantom lines to which the changing member is returned when the power transmission controlling apparatus finds a violation condition after the time period lapses.
Figure 5B:
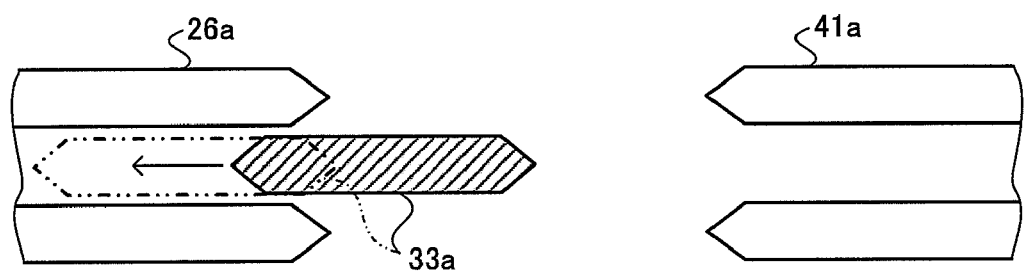
Figure 5C:
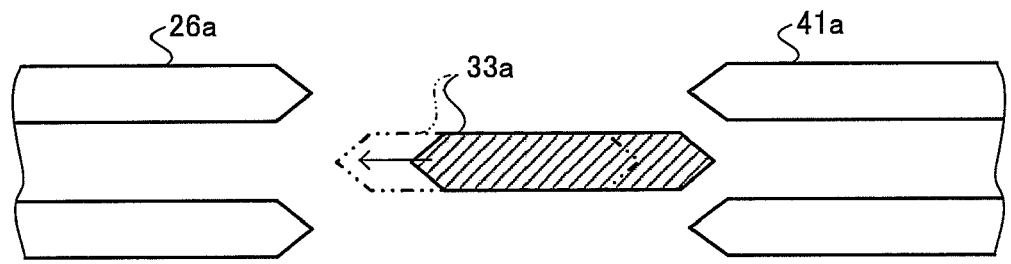

FIG. 4 is a flow chart showing part of the control program to be executed by the ECU 70 for performing the changing operation of the auxiliary transmission 20. The control program is executed to repeat the following processing operation with the operation of the high-low speed change switch 71 started for the speed change operation of the auxiliary transmission 20. FIG. 5(a), FIG. 5(b) and FIG. 5(c) respectively illustrate explanatory views showing first and second inner splines of the changing member changed in engaging states when operated by the power transmission controlling apparatus according to the preferred embodiment of the present invention, FIG. 5(a) showing a usual movement range of the changing member, FIG. 5(b) showing a returning direction of the changing member returning toward its original position when the power transmission controlling apparatus finds a violation condition within the time period of the operation thereof, and FIG. 5(c) showing a neutral position of the changing member when the power transmission controlling apparatus finds a violation condition after the time period lapses.

The process of controlling the changing operation of the auxiliary transmission 20 will then described with reference to FIG. 4.

The judgment is firstly made (Step S11) on whether or not the high-low speed change switch 71 is switched on, for example on whether or not the operation mode of the transfer 10 is changed from the High mode to the Low mode. When the answer in step S11 is "yes", the judgment is then made (Step S12) on whether or not the allowable changing condition to the changing operation of the auxiliary transmission 20 is established. More specifically, the judgment is made on whether or not the cruising speed of the motor vehicle is below the preliminarily set allowable speed [km/h], on whether or not the rotations of the engine is also below the preliminarily set allowable rotations [rpm], on whether or not the shift range is in the neutral state for the main transmission 2 in the case of the main transmission 2 being the automatic speed change mechanism, or the clutch is cut off in the case of the main transmission 2 being the manual speed change mechanism.

When the answer in step S12 is "yes", viz., the allowable changing condition to the changing operation of the auxiliary transmission 20 is established, the pulse motor 61 of the actuator unit 30 starts to be energized and driven to have the changing member 33 moved through the shift fork 35 from the high speed side position shown in FIG. 2(a) to the low speed side position shown in FIG. 2(b), and the timer is operated to calculate the time lapsed from the starting time when the changing operation is started by the pulse motors 61, 62 (Step S13).

The judgment is then repeated (Steps S17 and S29) every predetermined time from the starting time to the completion of the changing operation of the auxiliary transmission 20 on whether or not there are generated condition violations against the allowable changing condition (condition judgment 1). When the changing operation of the auxiliary transmission 20 is completed in the state that no condition violation is generated ("yes" in Step S29, for example changed to the position shown in phantom lines in FIG. 5(a)), the pulse motor 61 is stopped to have the first inner spline 33a of the changing member 33 stopped, and the timer calculating the lapsed time from the starting time of the changing operation of the auxiliary transmission 20 is cleared (Step S30).

When there is generated any one of the conditions violated against the allowable changing conditions for the changing operation of the auxiliary transmission 20 from the starting time when the auxiliary transmission 20 starts to perform the changing operation to the completion time when the changing operation of the auxiliary transmission 20 is completed, for example, when there is caused a condition violated against the allowable changing conditions at the time when the first inner spline 33a of the changing member 33 is moved to the position shown in solid lines in FIG. 5(b), the judgment result at the condition judgment 1 become "no" ("no" in Step S17).

In the case that the judgment result at the condition judgment 1 become "no", the buzzer 76 is operated to output an alarm indicative of the changing operation violated against the allowable changing conditions. In this case, the value of the timer is retained at the time when the condition for the changing operation is violated against the allowable changing conditions, or otherwise the value of the timer is memorized in the memory at the time when the condition for the changing operation is judged as being violated against the allowable changing conditions (Step S18).

The lapsed time from the starting time of the changing operation to the time of the violated condition generated is calculated based on the information from the timer (Step S19). From the lapsed time, the axial position of the changing member 33 axially moving is estimated (Step S20).

The judgment is then made in the time period previously mentioned, for example, on whether or not the stopped position of the changing member 33 is within the distance from a first axial position where the changing member 33 is engaged with the high speed stage wheel 26 to a second axial position where the changing member 33 is disengaged and thus released from the high speed stage wheel 26, or on whether or not the changing operation of the changing member 33 is incomplete and the changing member 33 is incompletely released from the high speed stage wheel 26 (Step S21). When the judgment result is "yes", the changing member 33 is returned together with the shift fork 35 to its starting position to be taken at the starting time as shown in phantom lines in FIG. 5(b). The returning operation of the changing member 33 is carried out by the pulse motor 61 of the actuator unit 30 reversely rotated by the ECU 70 (Step S22).

The judgment is then made on whether or not the changing member 33 is completely returned to the starting position, i.e., the original position (Step S23). When the returning operation of the changing member 33 is completed, the pulse motor 61 is stopped, and the timer calculating the time lapsed from the starting time of the changing operation is cleared (Step S24).

The judgment is then made on whether the high-low speed change switch 71 is "OFF" or not, and whether or not the changing operation for changing for example to the Low mode from the High mode is released (Step S15). If the judgment result is "yes", the buzzer 76 stops outputting an alarm output indicative of the operation violated against the allowable changing condition (Step S16) to return the judgment to the initial judgment process for judging whether or not the high-low speed change switch 71 is "ON" or "OFF" (Step S11).

When the judging means judges that any one of operation conditions is violated against the allowable changing condition to the changing operation of the auxiliary transmission 20 after the changing member 33 is completely released from the high speed stage wheel 26 ("no" in Step S21) as a result of the judgment on whether or not the stopped position of the changing member 33 is within the distance from the first axial position where the changing member 33 is engaged with the high speed stage wheel 26 to the second axial position where the changing member 33 is disengaged and thus released from the high speed stage wheel 26 (Step S21), the auxiliary transmission 20 is retained in the neutral state where the changing member 33 is disengaged and thus released from both the high speed stage wheel 26 and the cylindrical body 27. To retain the auxiliary transmission 20 in the neutral state, the pulse motor 61 of the actuator unit 30 is driven by the ECU 70 to axially move the changing member 33. The auxiliary transmission 20 is retained in the neutral state after the changing member 33 is axially moved from its axial position as shown in solid lines to its axial position between the wheel spline 26a of the high speed stage wheel 26 and the body spline 27a of the cylindrical body 27 as shown in phantom lines in FIG. 5(c) (Step S25).

Then, the judging means again judges that the changing operation of the auxiliary transmission 20 is released from the violated condition, viz., under the allowable changing condition in the state that the changing member 33 is in the neutral state between the wheel spline 26a of the high speed stage wheel 26 and the body spline 27a of the cylindrical body 27 (Step S26). If the main transmission 2, for example, is in the neutral range, and the judgment result is "yes", the buzzer 76 is stopped from outputting the alarm sound (Step S27). Then, the actuator unit 30 is again driven by the ECU 70 to resume the changing operation of the auxiliary transmission 20 (Step S28). The timer is again operated to calculate the time lapsed from the resuming time of the changing operation by the auxiliary transmission 20.

After the resumption of the changing operation, the judgment on the changing operation is moved to its process (Steps S17, S29) where the judgment (condition judgment 1) is repeatedly made until the changing operation is finished.

From the foregoing description of the present embodiment previously mentioned, it will be understood that the changing member 33 can be returned to its starting position to be taken at the starting time only when any one of the conditions violated against the allowable changing conditions for the changing operation of the auxiliary transmission 20 is generated in the time period from the starting time to the releasing time, viz., only when any one of the violated conditions is generated before the releasing operation is completed so that gear noises are reliably be prevented from being generated. The reason why gear noises are reliably be prevented from being generated is due to the fact that the changing member 33 disengaged from the high speed stage wheel 26 is again not engaged with the high speed stage wheel 26. Moreover, the returning operation of the changing member 33 results in the fact that the changing member 33 is maintained engaged with the high speed stage wheel 26, thereby preventing the power drive transmitting path from being cut off and ensuring so called "limp-home function". This means securing a high durability to the transfer 10, especially to the auxiliary transmission 20 and a high robustness in the control of the changing operation by the auxiliary transmission 20.

In the case that the auxiliary transmission 20 is retained in the neutral state where the changing member 33 is disengaged and thus released from both the high speed stage wheel 26 and the cylindrical body 27, gear noises are reliably be prevented from being generated by the same reason as previously mentioned.

In the case that the violated condition to the changing operation is generated after the changing member 33 is disengaged from the high speed stage wheel 26, the auxiliary transmission 20 is operated to be moved to its neutral state and to have the buzzer 76 notify the violated conditions to the changing operation, thereby reliably prompting the driver to eliminate the violated condition from the transfer 10.

In the above embodiment, the first judging means is adapted to memorize the time period, i.e., a first time period taken until the changing member 33 is disengaged from the high speed stage wheel 26 and to judge at least one time in the above time period on whether or not the allowable changing condition to the changing operation of the auxiliary transmission 20 is established so that the ECU 70 can preliminarily set the first time period in consideration of the time deviations required for the changing operation and acquire the completion timing of the releasing operation of the changing member 33 with no sensor for detecting the axial positions of the changing member 33, thereby enabling gear noises prevented from being generated.

The first time period is indicative of the moving time interval taken from the starting position assumed by the changing member 33 at the starting time to the releasing position assumed by the changing member 33 at the releasing time so that the releasing time can be easily and reliably set from the moving time interval, for example based on the moving distance and the moving speed of the changing member 33 until the changing member 33 is released from the high speed stage wheel 26 or the cylindrical body 27.

In addition, the present embodiment of the power transmission controlling apparatus has an actuator unit 30 so that the actuator unit 30 can perform the returning operation of the returning means for returning the changing member 33 to its starting position and perform the retaining operation of the retaining means for retaining the changing member 33 in the neutral state when the changing operation falls violated against the allowable changing condition to the changing operation in the neutral state, thereby making it possible to simplify the construction of the transfer 10 with the auxiliary transmission 20 located at the rear stage of the main transmission 2. The combination of the main transmission 2 and the auxiliary transmission 20 thus constructed can bring about the advantageous effects to prevent gear noises from being generated with certainty without limiting the shift operation of the main transmission 2 when the violated condition occurs in the auxiliary transmission 20.

Even if the auxiliary transmission 20 is returned to the neutral state when the violated condition appears in the changing operation of the auxiliary transmission 20 after the releasing operation of the auxiliary transmission 20 is finished in the present embodiment of the power transmission controlling apparatus, the auxiliary transmission 20 can resume the changing operation when the third judging means judges that the allowable changing condition to the changing operation of the auxiliary transmission 20 is established. This means that the auxiliary transmission 20 can quickly respond to the driver's request.

Although the power transmission controlling apparatus has been described with the main transmission 2 which is a type of automatically operated transmission, this invention may be applied to a manually operated transmission if the violated condition is judged based on the information acquired by the ECU 70 from a sensor which can detect the shifted positions of the shift lever incorporated in the manually operated transmission.

In the above description, there has not been described about the returning time required for the auxiliary transmission 20 to return its starting position when the violated condition is generated in the time period previously mentioned, the returning time is preliminarily set as a second time period longer than the first time period, and the auxiliary transmission may be returned to the starting position within the second time period longer than the first time period. In the above embodiment, the power transmission mechanism is constituted by a main transmission and an auxiliary transmission the latter of which has two stages such as High and Low stages, however, the present invention may be applied to an auxiliary transmission having a multi-stages, (for example, 3 stages). In the case of the multi-stage transmission, it is possible to change any one of the stages into a stage higher or lower than the stage now taken by the auxiliary transmission. The lever synchronizing mechanism previously mentioned may be replaced by any other known type of synchronizing mechanism according to the present invention.

From the foregoing description, it is to be understood that only when there is generated violated conditions during the changing operation of the auxiliary transmission before the releasing time of the changing operation, the auxiliary transmission is returned to its starting position taken at the starting time of the auxiliary transmission, thereby making it possible to reliably prevent unpleasant gear noses caused by the returning motion of the changing means after the releasing time. For this reason, even if the violated conditions are generated in the front stage side operation during the changing operation, the changing operation can be performed by the auxiliary transmission without limiting the operation of the front stage side such as a shift operation of the main transmission Accordingly, the power transmission controlling apparatus according to the present invention enables the auxiliary transmission to perform a smooth and stable changing operation of the auxiliary transmission with no unpleasant gear noises without imparting limitation to the operation of the main transmission, and can enhance durability of the auxiliary transmission.

What is claimed is:

1. A power transmission controlling apparatus for controlling a power transmission mechanism to change a drive power inputted therein and output said changed drive power in any one of a high speed output state to output said drive power at a high speed, and a low speed output state to output said drive power at a low speed output state, said power transmission controlling apparatus, comprising:

changing command means for outputting a changing command to change one of said high speed output state and said low speed output state into the other of said high speed output state and said low speed output state;

changing means for performing a changing operation to change one of said high speed output state and said low speed output state into the other of said high speed output state and said low speed output state with said changing command outputted by said changing command means;

first judging means for judging whether or not said changing operation of said changing means is under an allowable changing condition preliminarily set based on the operation states of said power transmission mechanism in the time period from a starting time to a releasing time, said starting time being indicative of having said power transmission mechanism start said changing operation, and said releasing time being indicative of having said power transmission mechanism released from said high speed output state and said low speed output state; and returning means for returning said power transmission mechanism to its starting state held at the starting time when said first judging means judges in the time period that said changing operation of said changing means is brought out of said allowable changing condition after said changing means starts said changing operation.

2. A power transmission controlling apparatus according to claim 1, wherein said power transmission mechanism is operative to assume a neutral state to output no drive power between said high speed output state and said low speed output state, said power transmission mechanism further comprises:

second judging means for judging whether or not said changing operation of said changing means is under said allowable changing condition after said releasing time of said changing operation by said changing means;

retaining means for retaining said power transmission mechanism in said neutral state after said power transmission mechanism is released from one of said high speed output state and said low speed output state and before said power transmission mechanism is changed into the other of said high speed output state and said low speed output state when said second judging means judges that said changing operation of said changing means is out of said allowable changing condition; and informing means for informing violation conditions with an alarm output indicative of said changing operation violated against said allowable changing condition when said second judging means judges that said changing operation of said changing means is out of said allowable changing condition.

3. A power transmission controlling apparatus according to claim 1, wherein said first judging means has a memory for preliminarily memorizing said time period from said starting time to said releasing time and operative to judge by at least one time in said time period whether or not said changing operation of said changing means is under said allowable changing condition.

4. A power transmission controlling apparatus according to claim 1, wherein said power transmission mechanism has a high speed side member formed with a high speed side spline, a low speed side member formed with a low speed side spline, and a changing member formed with first and second changing splines engageable selectively with said high speed side spline of said high speed side member and said low speed side spline of said low speed side member, respectively, said changing member being operative to have said power transmission mechanism operated in said high speed output state when said first changing spline of said changing member is engaged with said high speed side splines of said high speed side member, and to have said power transmission mechanism operated in said low speed output state when said second changing spline of said changing member is engaged with said low speed side spline of said low speed side member, said time period being indicative of a movement time for said changing member to move from said starting time to said releasing time.

5. A power transmission controlling apparatus according to claim 4, wherein said changing means includes an actuator unit to operate said changing member.

6. A power transmission controlling apparatus according to claim 1, wherein said power transmission mechanism is constituted by an auxiliary transmission positioned at the rear stage of a main transmission and drivably connected with said main transmission, said auxiliary transmission being operative in said high speed output state, said low speed output state and said neutral state, and said allowable changing condition being preliminarily set based on the operation states of said main transmission.

7. A power transmission controlling apparatus according to claim 2, further comprising:

third judging means for judging whether or not said changing operation of said changing means is under said allowable changing condition when said power transmission mechanism is retained in said neutral state by said retaining means, said power transmission mechanism being operative to have said changing means resume said changing operation when said third judging means judges that said changing operation of said changing means is under said allowable changing condition.

8. A power transmission controlling apparatus for controlling a power transmission mechanism to change a drive power inputted therein and output said changed drive power in any one of output states selected from among a high speed output state to output said drive power at a high speed, a low speed output state to output said drive power at a low speed output state, and a neutral state to output no drive power between said high speed output state and said low speed output state, said power transmission controlling apparatus, comprising:

a speed change switch for sending a command signal indicative of starting to operate said power transmission mechanism to perform a changing operation to change one of said high speed output state and said low speed output state into the other of said high speed output state and said low speed output state;

an actuator unit for performing said changing operation to change one of said high speed output state and said low speed output state into the other of said high speed output state and said low speed output state with said command signal outputted by said speed change switch;

an electronic control unit operative to judge whether or not said changing operation of said power transmission mechanism is under an allowable changing condition preliminarily set based on the operation states of said power transmission mechanism in the time period from a starting time to a releasing time before said neutral state of said power transmission mechanism, said starting time being indicative of having said power transmission mechanism start said changing operation, and said releasing time being indicative of having said power transmission mechanism released from said high speed output state and said low speed output state, said electronic control unit being operative to permit said power transmission mechanism to start said changing operation with said changing command outputted by said speed change switch when said electronic control unit judges in said time period that said changing operation is under said allowable changing condition; and said actuator unit being operative to return said power transmission mechanism to its starting state held at the starting time when said electronic control unit judges in the time period that said changing operation of said power transmission mechanism is brought out of said allowable changing condition after said power transmission mechanism starts said changing operation.

9. A power transmission controlling apparatus according to claim 8, wherein, said electronic control unit is operative to judge whether or not said changing operation of said power transmission mechanism is under said allowable changing condition after said releasing time of said changing operation by said changing means, and said actuator unit is operative to retain said power transmission mechanism in said neutral state after said power transmission mechanism is released from one of said high speed output state and said low speed output state and before said power transmission mechanism is changed into the other of said high speed output state and said low speed output state when said electronic control unit judges that said changing operation of said power transmission mechanism is out of said allowable changing condition, and which further comprises: a buzzer for informing violation conditions with an alarm output indicative of said changing operation violated against said allowable changing condition when said electronic control unit judges that said changing operation of said power transmission mechanism is out of said allowable changing condition.

10. A power transmission controlling apparatus according to claim 8, wherein said electronic control unit has a memory for preliminarily memorizing said time period from said starting time to said releasing time and operative to judge by at least one time in said time period whether or not said changing operation of said power transmission mechanism is under said allowable changing condition.

11. A power transmission controlling apparatus according to claim 8, wherein said power transmission mechanism is constituted by an auxiliary transmission positioned at the rear stage of a main transmission and drivably connected with said main transmission, said auxiliary transmission being operative in said high speed output state, said low speed output state and said neutral state, and said allowable changing condition being preliminarily set based on the operation states of said main transmission.

12. A power transmission controlling apparatus according to claim 9, wherein, said electronic control unit is operative to judge whether or not said changing operation of said power transmission mechanism is under said allowable changing condition when said power transmission mechanism is retained in said neutral state by said actuator unit, said power transmission mechanism being operative to have said actuator unit resume said changing operation when said electronic control unit judges that said changing operation of said power transmission mechanism is under said allowable changing condition.

13. A power transmission controlling apparatus according to claim 8, wherein said power transmission mechanism has a high speed side member formed with a high speed side spline, a low speed side member formed with a low speed side spline, and a changing member formed with first and second changing splines engageable selectively with said high speed side spline of said high speed side member and said low speed side spline of said low speed side member, respectively, said changing member being operative to have said power transmission mechanism operated in said high speed output state when said first changing spline of said changing member is engaged with said high speed side splines of said high speed side member, and to have said power transmission mechanism operated in said low speed output state when said second changing spline of said changing member is engaged with said low speed side spline of said low speed side member, said time period being indicative of a movement time for said changing member to move from said starting time to said releasing time.

14. A power transmission controlling apparatus according to claim 13, wherein said power transmission mechanism is constituted by an auxiliary transmission positioned at the rear stage of a main transmission and drivably connected with said main transmission, said auxiliary transmission being operative in said high speed output state, said low speed output state and said neutral state, and said allowable changing condition being preliminarily set based on the operation states of said main transmission, said high speed side member and said low speed side member operative to have said auxiliary transmission to transmit said drive power in any one of said high speed output state and said low speed output state, respectively.

* * * * *